E. ZAHM & C. A. NAGEL.
FILTER.
APPLICATION FILED MAY 25, 1917.
1,294,018.
Patented Feb. 11, 1919.
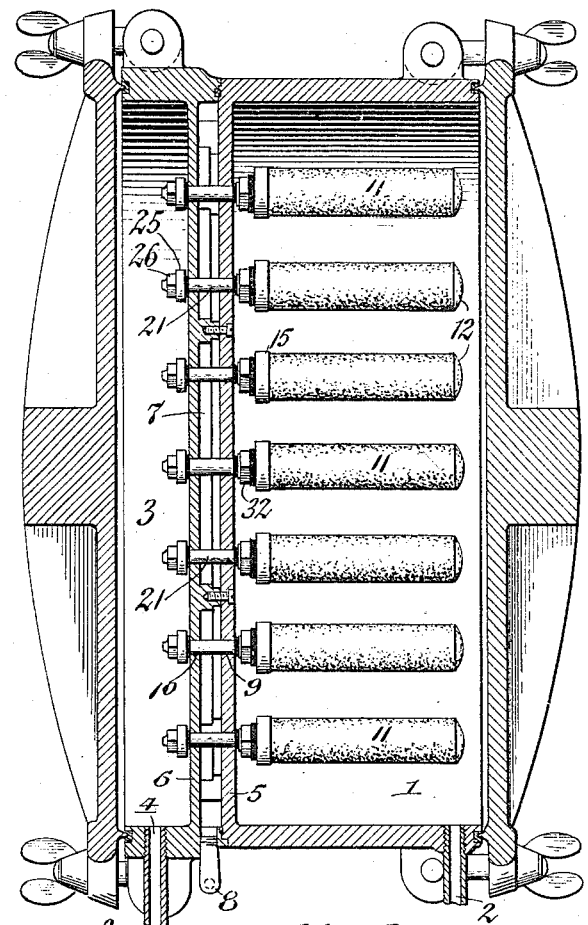
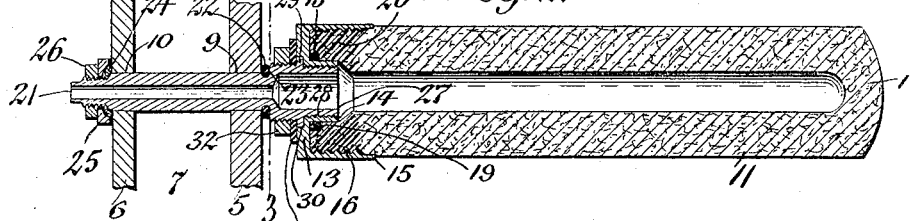
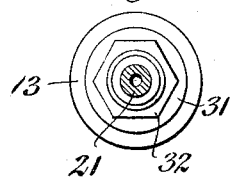
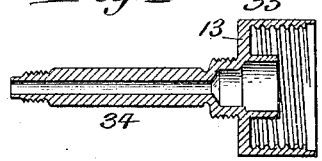
Inventors:
Edward Zahm
Charles A. Nagel
by Geyer & Popk
Attorneys

UNITED STATES PATENT OFFICE.

EDWARD ZAHM AND CHARLES A. NAGEL, OF BUFFALO, NEW YORK, ASSIGNORS TO ZAHM MANUFACTURING COMPANY, OF BUFFALO, NEW YORK, A CORPORATION OF NEW YORK.

FILTER.

1,294,018.

Specification of Letters Patent.

Patented Feb. 11, 1919.

Application filed May 25, 1917. Serial No. 170,969.

*To all whom it may concern:*

Be it known that we, EDWARD ZAHM and CHARLES A. NAGEL, citizens of the United States, residing at Buffalo, in the county of Erie and State of New York, have invented new and useful Improvements in Filters, of which the following is a specification.

This invention relates more particularly to that class of filters in which a plurality of filter tubes are employed through which the liquid to be filtered is passed from an inlet chamber and then discharged into an outlet chamber.

The object of this invention is to improve the means for mounting these filter tubes individually upon the support, partitions or walls between the inlet and outlet chambers, so as to increase the strength of the tubes at their point of support; also to reduce to a minimum the possibility of leakage through the joints between the tube and its mounting; also to permit of more readily renewing the body of the filter when this becomes necessary and also to permit of more thoroughly and conveniently cleaning the interior of the filter tubes.

In the accompanying drawings:

Figure 1 is a vertical longitudinal section of a filter provided with our improvements. Fig. 2 is a fragmentary longitudinal section, on an enlarged scale, showing the manner of mounting the filter tube on a support or wall of the filter. Fig. 3 is a vertical transverse section taken on line 3—3, Fig. 2. Fig. 4 is a fragmentary longitudinal section showing a modified construction of the head and neck forming part of the improved mounting of the filter tube.

Similar characters of reference indicate corresponding parts throughout the several views.

1 represents the inlet chamber of the filter into which the liquid to be filtered is introduced by means of a supply pipe 2 and 3 the outlet chamber which receives the filtered liquid and delivers the same through a discharge pipe 4. These chambers are arranged side by side and their opposing inner walls or partitions 5, 6 are preferably separated by an intervening space 7 which communicates with the outer atmosphere through a drip pipe 8. These inner walls of the filter chambers are also provided with a plurality of pairs of coinciding openings 9, 10 in which the filter tubes are supported in a manner which will be hereinafter described.

11 represents the cylindrical bodies of the filter tubes each of which is closed at its front end by means of a front head 12 which is preferably formed integrally therewith of porous material. At its rear end each of the filtering bodies is provided with an integral head which comprises a flat ring 13 extending across the rear end of the filter body, an inner tubular bushing 14 extending forwardly from the inner edge of the ring into the rear part of the bore of the filter body, and an outer tubular ferrule 15 projecting forwardly from the outer edge of the ring and around the adjacent part of the periphery of the filter body, as shown in Fig. 2. This head may be secured to the filter body in any suitable manner but preferably by providing the ferrule with an internal screw thread 16 which engages with an external screw thread formed on the rear part of the body, as shown in Fig. 2. A leak-tight joint is produced between this head and the filter body by means of a gasket or packing ring 18 of rubber or similar elastic material surrounding the bushing and bearing with its front side against the bottom of an annular rabbet 19 formed on the rear end of the filter body while its rear side bears against the inner or front side of the ring 13. By this means the head is secured to the filter body without removing an undue portion of its stock and thereby preserving a greater thickness in the rear end of the filter body, so that the same is not liable to be easily broken while being cleaned time to time.

In order to further strengthen the filter tube and enable the same to resist breakage adjacent to its mounting, the rear end of the same is saturated or impregnated with a filling or indurating material, such as pitch or resin, the area of this filling being indicated by the shaded area 20 in Fig. 2.

Various means may be employed for mounting this filter tube on the support which is formed by the opposing inner heads 5, 6 of the inlet and outlet chambers, that shown in Figs. 1, 2 and 3 being constructed as follows:

21 represents a plurality of tubular necks each of which projects through a pair of corresponding openings 9, 10 in the chamber walls 5, 6 and is removably secured therein, so as to produce a tight joint between this neck and these walls. This is preferably effected by means of a front annular gasket or packing ring 22 of rubber or similar material surrounding the front part of the neck and bearing with its front side against a rearwardly-facing shoulder 23 on the neck, while its rear side bears against the front side of the wall 5, and a rear packing ring 24 surrounding the rear part of the neck and bearing with its front side against the rear side of the rear wall 6 while its rear side bears against a follower or washer 25 which is held in place by means of a clamping screw nut 26 engaging with a rear external screw thread on the rear end of the neck and bearing against the rear side of the follower, as shown in Fig. 2.

At its front end the neck is provided with a tubular shank 27 which has a front external screw thread 28 engaging with an internal screw thread formed in the bore of the bushing, and an annular external flange 29 arranged adjacent to the rear end of the screw thread 28 and engaging with an annular rabbet 30 formed on the rear end of the body of the filter tube. The joint between this neck and head is sealed or packed against leakage by means of a washer or gasket 31 of rubber or similar material engaging with the rear sides of the flange 29 and the ring 13 and extending across the joint between the same, and a clamping screw nut 32 engaging with an intermediate external screw thread formed on the neck in rear of the flange 29 and bearing against the rear side of the gasket 31, as shown in Fig. 2.

Due to this construction the body of the filter tube can be readily attached to and removed from this neck which permits of conveniently renewing the porous filter member when the same becomes broken or worn out. When the several members are assembled the various joints between the same are securely packed against leakage, and when they are dismembered the interior of the porous member can be easily and thoroughly cleaned as well as its outer side, thereby enabling the maximum efficiency of the filter to be maintained at all times.

Instead of making the rear head of the porous filter tube separate from the neck, this head 33 and the neck 34 may be formed integrally, as shown in Fig. 4. This last-mentioned construction, while possessing all the advantages of our improvements so far as firmly supporting the filter tube on the filter chambers is concerned, does not however permit of cleaning the interior of the filter as readily and conveniently as the construction shown in Figs. 1–3.

We claim is our invention:

1. A filter comprising a porous tubular body, a head mounted on the end of said body and comprising a ring arranged across the end of the body, an inner tubular bushing projecting from the inner edge of the ring into the bore of said body and an outer tubular ferrule projecting from the outer edge of said ring and around the periphery of said body, a wall provided with an opening, and a tubular neck connected with said inner bushing and arranged in the opening of said wall.

2. A filter comprising a porous tubular body, a head mounted on the end of said body and comprising a ring arranged across the end of the body, an inner tubular bushing projecting from the inner edge of the ring into the bore of said body and an outer tubular ferrule projecting from the outer edge of said ring and around the periphery of said body, said ring, bushing and head being formed integrally of metal, a wall provided with an opening, and a tubular neck connected with said bushing and arranged in the opening of said wall.

3. A filter comprising a porous tubular body, a head mounted on the end of said body and comprising a ring arranged across the end of the body, an inner tubular bushing projecting from the inner edge of the ring into the bore of said body and an outer tubular ferrule projecting from the outer edge of said ring and around the periphery of said body, said bushing being provided with an internal screw thread, a tubular neck having an externally threaded shank engaging with the thread of said bushing, a clamping screw nut mounted on said neck and movable toward said head, and a wall provided with an opening in which said neck is secured independently of said screw nut.

4. A filter comprising a porous tubular body, a head mounted on the end of said body and comprising a ring arranged across the end of the body, an inner tubular bushing projecting from the inner edge of the ring into the bore of said body and an outer tubular ferrule projecting from the outer edge of said ring and around the periphery of said body, said bushing being provided with an internal screw thread, and a tubular neck having an externally threaded shank engaging with the thread of said bushing, and a clamping screw nut mounted on said neck and movable toward said head.

5. A filter comprising a porous tubular body, a head mounted on the end of said body and comprising a ring arranged across the end of the body, an inner tubular bushing projecting from the inner edge of the ring into the bore of said body and an outer tubular ferrule projecting from the outer edge of said ring and around the periphery of said body, said head being provided in its bushing with an internal screw thread and at the rear end of said bushing with an annular rabbet, a tubular neck having an externally threaded shank engaging with the thread of said bushing and an annular external flange engaging with said rabbet, a packing across the joint between said neck and head, a clamping screw nut arranged on said neck and engaging said packing, and a wall having an opening in which said neck is secured independently of said screw nut.

EDWARD ZAHM.
CHARLES A. NAGEL.

Copies of this patent may be obtained for five cents each, by addressing the "Commissioner of Patents, Washington, D. C."